Oct. 6, 1964

B. J. SCHEBLER 3,152,295

PULSED TANK CIRCUIT MAGNETO-OR ELECTRO-STRICTIVE DEVICE EXCITATION

Filed May 1, 1961

*INVENTOR.*
BERNARD J. SCHEBLER

*BY* [signature]

ATTORNEY

United States Patent Office 3,152,295
Patented Oct. 6, 1964

3,152,295

PULSED TANK CIRCUIT MAGNETO- OR ELECTROSTRICTIVE DEVICE EXCITATION

Bernard J. Schebler, Davenport, Iowa, assignor to The Bendix Corporation, Davenport, Iowa, a corporation of Delaware Filed May 1, 1961, Ser. No. 106,826
6 Claims. (Cl. 318—118)

Figure 1:
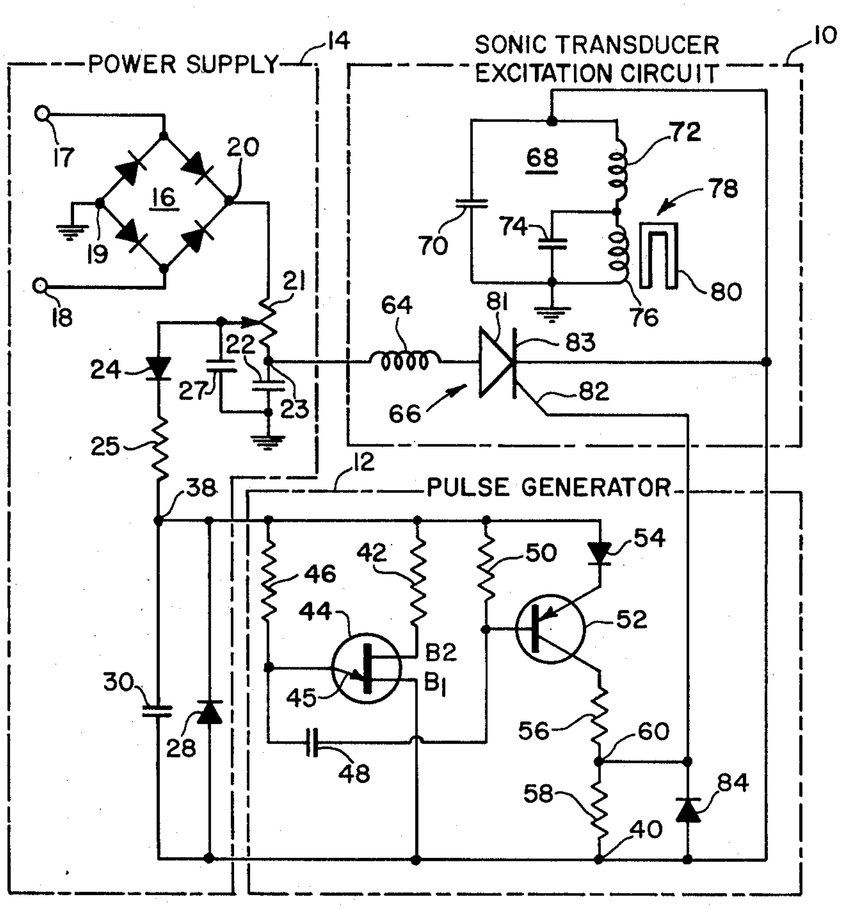

This invention relates to improvements in sonic generating methods and means and particularly to sonic generators which comprise an electrical generator including an electrical-to-mechanical sonic energy transducer.

Among the objects of the invention is the provision of novel methods and novel means for economically and efficiently powering sonic transducers.

Sonic transducers, whether magnetostrictive or piezoelectric, are advantageously energized with sinusoidally varying electrical power. Because they are operated at higher frequencies, sonic transducers cannot be energized directly from commercial, sixty cycle sources. The problem then is to provide high frequency, sinusoidal electrical excitation for sonic transducers from a D.C. or lower frequency A.C. source with minimum equipment and greatest efficiency.

High efficiency is desirable not only for economical operation but perhaps more importantly to avoid the heating incident to lower efficiency.

The equipment for sinusoidal transducer excitation can be met by connecting the transducer in a resonant electrical circuit. High efficiency can be achieved by introducing power to the resonant circuit in pulses through a switching device having low resistive impedance in its conducting mode or "switch closed" condition. Electronic switches having high current capacity and low conductive mode resistance are available. Examples are the silicon controlled rectifier and other semiconductor devices which are rendered conductive by electrical control signals. However, the available devices, once conductive, are difficult to render non-conductive with the result that the rate at which they could be switched have been too low for sonic applications.

The invention provides a novel method and circuit arrangement for increasing the rate at which these devices can be switched. But it is not limited to this feature. It combines efficient power inversion, the advantageous mode of transducer excitation, and frequency control to provide an improved and inexpensive sonic generator.

In the invention the transducer, that is its electrical side, is connected to a resonant circuit. In the preferred embodiment this is a parallel resonant circuit permitting the flow of unidirectional current through one leg for reasons that will be hereinafter apparent. The resonant circuit is connected to a unidirectional source of power and means are provided in this connection for permitting the flow of electricity to the resonant circuit only during portions of the resonant circuit oscillation cycle when such current will aid the oscillation. This means comprises a rectifier, whose operation is electrically controlled, and a control means for rendering the rectifier conductive at a frequency higher than the natural oscillation frequency of the resonant circuit. It further comprises means for utilizing this frequency difference to terminate rectifier conductivity.

Other objects and advantages of the invention will hereinafter be apparent from the description of the embodiments shown in the accompanying drawing, it being understood that various modifications of the embodiments shown, and other embodiments of the invention, are possible within the spirit of the invention and the scope of the appended claims.

Figures 2, 3:
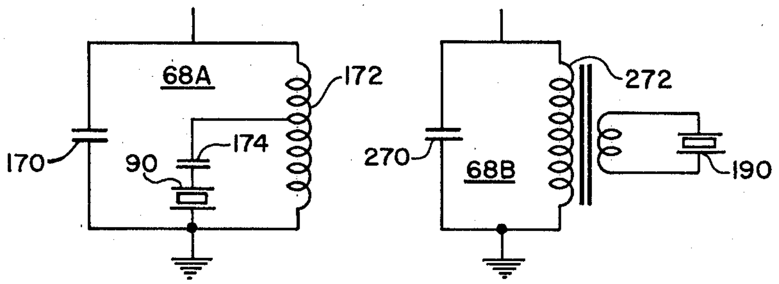

In the drawings:

FIG. 1 is a circuit diagram of a sonic generator including a magnetostrictive transducer and embodying the invention; and FIG. 2 is a circuit diagram, partly schematic of a sonic generator including a piezoelectric transducer and embodying the invention and FIG. 3 shows another resonant circuit for a piezoelectric transducer.

The drawings illustrate one means for practicing the method of the invention which later may be defined as the method of electrically energizing a sonic transducer by oscillating currents in a parallel resonant circuit by current pulses introduced into the circuit through a switch of the type which is turned off by voltage inversion, which comprises the step of turning the switch on at a frequency exceeding the natural frequency of said resonant circuit by an amount not exceeding fifty percent of said natural frequency. Advantageously the switching frequency does not exceed said natural frequency by more than twenty-five percent.

The circuit of FIG. 1 comprises a sonic transducer excitation circuit including a controlled rectifier and means for providing rectifier control signals. In the embodiment shown, the excitation circuit is generally designated by the numeral 10 and the means for providing control signals is a pulse generator designated 12. The excitation circuit and pulse generator are arranged for energization from a unidirectional power source such as power supply 14.

*The Power Supply*

It is required only to provide unidirectional power to the sonic transducer excitation circuit. However, the arrangement of the excitation circuit permits the use of a relatively low voltage source whereby it is possible to take the power from commercial low voltage A.C. power lines and convert to unidirectional power without the need for a power transformer even in the case of high powered sonic generators. To illustrate this advantage and the further advantage that extensive filtering action is not required in the conversion from A.C. to D.C. because of the character of the transducer excitation circuit, a typical A.C. to D.C. power supply circuit is included in the drawing.

The power supply 14 comprises a conventional bridge rectifier 16 having input terminals 17 and 18 for connection to a source of alternating electrical power. The negative terminal 19 of the bridge is connected to common ground. The positive output terminal 20 is connected to a resistance-capacitance filter network consisting of a tapped resistor 21 connected from terminal 20 to ground through filter capacitor 22. A second filter capacitor 27 is connected from the tap of resistor 21 to ground. Terminal 23, intermediate resistor 21 and capacitor 22, is the positive supply terminal for the sonic transducer excitation circuit.

The tap of resistor 21 is the positive terminal of the circuit which supplies power to the pulse generator. This circuit is traced from the tap of resistor 21, through a blocking rectifier 24, a voltage dropping resistor 25, the parallel circuit combination of the Zener diode 28 and a capacitor 30, to a connection in the sonic transducer excitation circuit on the side of the resonant circuit away from ground. The elements 24, 25, 28, and 30 comprise a voltage regulator having a positive supply terminal 38 at the junction of resistor 25 with the parallel Zener diode 28 and capacitor 30 circuit. The negative supply terminal 40 is at the opposite end of this parallel circuit. The voltage drop across the Zener diode remains constant so the voltage applied to the pulse generator is constant. However, the pulse generator supply "float" with respect to system ground because the direct current return path extends from terminal 40 through the resonant circuit to ground so the voltage at points 38 and 40 will vary with respect to ground in accordance with voltage variations across the resonant circuit.

*The Pulse Generator*

The pulse generator may be, and the circuit selected for illustration is, conventional. As will be described later, point 38 is positive with respect to point 40. A resistor 42 and the base-two $B_2$, and base-one $B_1$, contacts of a unijunction transistor 44 are connected in series in that order from point 38 to point 40. The emitter electrode 45 of transistor 44 is connected to point 38 through a resistor 46. In parallel with this resistor 46 there is connected the series combination of a capacitor 48 and a resistor 50 such that the capacitor is toward the emitter and the resistor is toward point 38. The base of a PNP transistor 52 is connected intermediate resistor 50 and capacitor 48. The emitter of this transistor is connected through a biasing diode 54 to point 38 and its connector is connected through a voltage dividing network comprising resistors 56 and 58, in that order, to point 40. The output of the pulse generator is taken across resistor 58, that is across points 60 (positive) and 40 (negative).

The pulse generator operates as follows. Initially there is no charge on capacitor 48 because both of its sides are connected to the positive terminal 38, one through resistor 46 and the other through resistor 50. Accordingly, the emitter 45 is at the potential of point 38 and a large electron current will flow from emitter 45 to base $B_1$ which is at the potential of negative point 40. Resistor 50 has less resistance than does resistor 46 so this current flows to the emitter through resistor 50 and capacitor 48. The emitter to base-one resistance of the transistor 44 decreases appreciably as this current flows so capacitor 48 charges very rapidly thereby reducing the emitter voltage very rapidly until emitter current ceases. Thereafter, capacitor 48 discharges through resistors 50 and 46. The latter has relatively great resistance so the discharge rate is less than the initial charging rate. As the capacitor 48 discharges the potential at emitter 45 becomes more positive. When it becomes sufficiently positive, emitter current again flows and the cycle is repeated.

In each cycle capacitor 48 charges rapidly through resistor 50. Each time that occurs a voltage is developed across resistor 50 which is sufficient to overcome the bias of diode 54 whereby transistor 52 becomes conductive. It remains conductive during the short interval during which capacitor 48 is charged. The result is that current pulses flow through resistors 56 and 58 and through the rectifier control circuit connected in parallel with resistor 58 across terminals 60 and 40. The frequency of these pulses is determined by the time constant of the capacitor 48 charging and discharging circuits.

More specifically, the frequency is equal to the reciprocal of the sum of the charge and discharge times. The voltage on capacitor 48 varies from a value corresponding to the minimum voltage across the $B_1$ junction of device 44 which will sustain conduction to a voltage which is less than the supply voltage by the amount of the voltage loop across devices 44 (45 to $B_1$), 52 and 54 while they are conducting. The charging time is the time required to change the voltage on capacitor 48 by this amount through a resistance equal to the resistance of the 45–$B_1$ junction of device 44 in series with the parallel combination of resistor 50 and the resistances to current flow of devices 54 and 52 in series. The discharge time is simply the time to vary the voltage across $C_{48}$ by this same amount by discharge thru resistors 50 and 46 in series.

*The Sonic Transducer Excitation Circuit*

The transducer excitation circuit comprises a resonant circuit in which the transducer is included such that sinusoidally varying power is dissipated in its resistive impedance as a result of electrical oscillation in the resonant circuit. The specific arrangement of the circuit may be varied in view of the transducer impedance characteristics to permit use of a variety of transducer types. Two limitations control selection of specific resonant circuitry. The first of these is a limiting factor only if the rectifier control circuit is to float above ground as in the case, for example, of the pulse generator shown in the drawing. In such cases the resonant circuit must include a direct current path to ground.

The other limitation is related to the means by which the rectifier is turned off. In the interests of clarity, this second limitation will be defined after the illustrated embodiment of the invention is described.

In the drawing, the transducer excitation circuit extends from terminal 23 through an iductor 64, through the rectifier 66 and then through a parallel circuit 68 to ground.

The parallel circuit 68 has only a capacitor 70 in one leg. The other leg includes an inductor 72 in series with the parallel combination of a capacitor 74 and the energizing winding 76 of a magnetostrictive transducer 78. The core of the transducer is designated 80.

Capacitor 74 may be omitted unless it is desirable to fire the rectifier at a submultiple of the transducer operating frequency. However, its inclusion is advantageous even when these frequencies are the same because its use helps to make more sinusoidal the wave shape of voltage and current applied to the transducer under varying load conditions. When used, capacitor 74 is selected so that the combination of capacitor 74 and energizing winding 76 is resonant at approximately the natural resonant frequency of the transducer core.

The rectifier 66, shown in the drawing, is a silicon controlled rectifier and it advantageously comprises a multiple PN junction structure which is excited to high conduction mode in one direction in response to signal current flow across one of its junctions and which is responsive to application of reversed voltage across the whole structure to revert from high conduction to low conduction mode. Such devices are available in PNPN structure form in which the P end region is the anode and the N end region is the cathode. They are excited to high conduction by a current pulse from the P to N region at the cathode end. In the drawing, the numerals 81, 82, and 83 designate the rectifier anode, control electrode and cathode, respectively.

The output terminals 40 and 60 of the pulse generator are connected to cathode 83 and control electrode 82, respectively. By this connection, current pulses are made to flow through the rectifier from the control electrode to the cathode. These pulses are advantageously supplied by the pulse generator at a frequency corresponding approximately to the natural resonant frequency of the transducer core, or submultiples of that frequency. Thus the rectifier is turned on at the resonant frequency or a submultiple of that frequency, of the transducer.

Upon being turned on or fixed, the rectifier permits current flow to the resonant circuit 68 where it charges capacitor 70. After each firing it must be turned off before the next half cycle of resonant circuit alternation begins.

Operation of the circuit is described as follows. With the power supply in operation, capacitor 22 is charged. The pulse generator delivers a pulse which is manifested as a current pulse from electrode 82 to anode 83 of the rectifier 66 and the rectifier 66 is turned on. Current flows from the power supply, and its charged capacitor 22, through inductance 64 and rectifier 66 to charge capacitor 70, the charge on capacitor 22 decreases and that on capacitor 70 increases until they are equal. During this time a field is built up in inductor 64 which then begins to collapse to force more current into capacitor 70 and increase its voltage to a value above the supply voltage. This effect is aided by inductor 72 of the resonant circuit 68. As current flow into capacitor 70 begins to decrease, the field about inductor 72 begins to collapse to force more current into capacitor 70 to insure that its voltage exceeds in a very short time the voltage applied to the opposite side of rectifier 66. Thus the anode side of the rectifier is made negative with respect to its cathode side and the rectifier is turned off.

This reversal of relative polarity across the rectifier will be accomplished rapidly if inductor 72 of the resonant circuit is reacting to force current into capacitor 70 at a rapid rate at the time when capacitor 70 is charged up to the voltage of capacitor 22. This action is accomplished by making the resonant frequency of circuit 68 lower than the frequency at which the rectifier 66 is fired. The rectifier firing frequency advantageously exceeds the circuit 68 natural frequency by no more than 25%.

Current flow through the rectifier 66 will force electrical oscillation in circuit 68 in a shorter than normal period with the result that the wave shape of transducer current and voltage will deviate from a sinusoid. Frequency differences exceeding 25% will increase distortion without aiding the turnoff action. Smaller differences result in slower turn-off and lower distortion. However, the distortion is not serious and it can be materially and readily overcome by use of capacitor 74 as described.

Thus, the second limitation, mentioned above, on resonant circuit design is that the resonant circuit includes sufficient inductance to provide the action just described. In certain transducer designs the excitation winding has enough inductance; in others an auxiliary inductor, such as inductor 72, is added.

A rectifier 84 is connected across the pulse generator output terminals 40 and 60. Its function is to insure that voltage variations across the resonant circuit are not effective to damage rectifier 66 by exceeding its peak gate reverse bias voltage.

Electrically, piezoelectric transducers have a series resonant equivalent circuit so that a modified arrangement is required if the resonant circuit must include a D.C. path to ground. FIGS. 2 and 3 show two of such modifications of the resonant circuit. The parallel resonant circuit 68A of FIG. 2 comprises, in one leg, a capacitor 170, and, in the other leg, an inductor 172 and a capacitor 174 and a piezoelectric crystal 90 connected in series across a portion of the inductor 172. This circuit, 68A, is substituted for circuit 68 of FIG. 1. Inductor 172 forms a D.C. path to ground; capacitor 174, crystal 90, and the portion of inductor 172 which they bridge, are resonant at substantially the natural oscillation of the crystal. The whole circuit 68A is resonant at a frequency below the crystal and rectifier 66 firing frequency.

The parallel resonant circuit 68B is also intended as an alternative for circuit 68 of FIG. 1. It comprises a capacitor 270 in one leg and the primary winding of a transformer 272 in the other. The crystal 190 is connected across the transformers secondary winding. The D.C. path extends through the transformer primary winding. Like circuits 68 and 68A, circuit 68B is resonant at a frequency below the crystal 190 and rectifier 66 firing frequency.

I claim:

1. A sonic generator comprising, in series circuit for energization from a unidirectional electrical power source an inductor, a rectifier of the type rendered nonconductive by application of inverse voltage, and a resonant circuit exhibiting parallel resonance and including the electrical side of a sonic transducer; said transducer having a mechanical resonant frequency greater than the resonant frequency of said resonant circuit; and means for rendering said rectifier conductive at a frequency greater than the resonant frequency of said resonant circuit and approximately equal to said mechanical electrical frequency.

2. A sonic generator comprising, in series circuit for energization from a unidirectional electrical power source; an inductor, a rectifier of the type rendered conductive in response to an electrical control signal, and a capacitor; an electrical to mechanical transducer having an electrical side exhibiting at least resistive impedance; and means including the electrical side of said transducer and exhibiting both resistive and inductive impedance connected in parallel with said capacitor for forming a resonant circuit therewith; and means for applying electrical signals to said rectifier at a frequency greater than the resonant frequency of said resonant circuit and less than one and one half times said resonant frequency.

3. The invention defined in claim 1 in which said transducer has a mechanical frequency equal to an integral multiple of the resonant frequency of said resonant circuit.

4. A sonic generator comprising, in series circuit for energization from a unidirectional electrical power source, a first unsaturated inductor, a rectifier of the type rendered conductive in response to an electrical signal, and a resonant circuit comprising the parallel combination of a second inductor and a capacitor; a sonic transducer comprising a magnetostrictive core and an energizing winding, the latter forming at least a portion of said second inductor; and means for applying electrical signals to said rectifier at a frequency greater than the resonant frequency of said resonant circuit by an amount less than half of said resonant frequency.

5. The invention defined in claim 3 in which said energizing winding comprises less than the whole of said second inductor and including a second capacitor connected in parallel with said energizing winding and forming therewith a second parallel circuit exhibiting predominantly resistive impedance in said resonant circuit.

6. The invention defined in claim 1 in which said rectifier comprises a multiple PN junction semiconductor structure of the type which is excited to a high conduction mode in one direction in response to signal current flow across one of its junctions and responsive to application of inverse voltage to revert from high conduction to low conduction mode, and in which said means for applying electrical signals comprises a pulse generator having a current pulse output circuit connected across said one junction of the semiconductor structure.

References Cited in the file of this patent

UNITED STATES PATENTS

| | | |
|---|---|---|
| 2,498,760 | Kreithen | Feb. 28, 1950 |
| 2,550,771 | Camp | May 1, 1951 |
| 2,623,931 | Bagno | Dec. 30, 1952 |
| 2,738,467 | Roberts | Mar. 13, 1956 |
| 2,761,077 | Harris | Aug. 28, 1956 |
| 2,877,359 | Ross | Mar. 10, 1959 |

OTHER REFERENCES

Cockrell, W. D.: Industrial Electronic Control, first edition, page 112, Fig. 87; McGraw-Hill, New York, 1944.